United States Patent
Razavi et al.

(10) Patent No.: US 6,370,449 B1
(45) Date of Patent: Apr. 9, 2002

(54) UPGRADABLE VEHICLE COMPONENT ARCHITECTURE

(75) Inventors: Behfar Razavi, San Jose; Owen M. Densmore, Palo Alto; Guy W. Martin, San Jose, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/332,349

(22) Filed: Jun. 14, 1999

(51) Int. Cl.$^7$ .............................................. G06F 17/00
(52) U.S. Cl. .............................. 701/1; 701/33; 701/36; 340/438
(58) Field of Search ............................... 701/1, 24, 33, 701/36, 48, 102; 340/855.1, 855.2, 855.3, 825.07, 438; 370/352, 354

(56) References Cited

U.S. PATENT DOCUMENTS

| | | | |
|---|---|---|---|
| 4,258,421 A | * 3/1981 | Juhasz et al. ................. | 701/24 |
| 4,787,040 A | 11/1988 | Ames et al. | |
| 4,811,240 A | 3/1989 | Bailou et al. | |
| 4,827,520 A | 5/1989 | Zeinstra | |
| 5,227,768 A | 7/1993 | Beckett et al. | |
| 5,303,348 A | * 4/1994 | Botzenhardt et al. ....... | 710/114 |
| 5,400,018 A | 3/1995 | Scholl et al. | |
| 5,442,553 A | 8/1995 | Parrillo | |
| 5,555,502 A | 9/1996 | Opel | |
| 5,640,511 A | * 6/1997 | Botzenhardt et al. ......... | 714/57 |
| 5,732,074 A | 3/1998 | Spaur et al. | |
| 5,732,368 A | 3/1998 | Knoll et al. | |
| 5,751,956 A | 5/1998 | Kirsch | |
| 5,805,442 A | 9/1998 | Crater et al. | |
| 5,808,197 A | 9/1998 | Dao | |
| 5,815,071 A | 9/1998 | Doyle | |
| 5,844,473 A | 12/1998 | Kaman | |
| 5,917,405 A | 6/1999 | Joao | |
| 5,956,487 A | 9/1999 | Venkatraman et al. | |
| 5,974,368 A | 10/1999 | Schepps et al. | |
| 6,009,355 A | 12/1999 | Obradovich et al. | |
| 6,009,363 A | 12/1999 | Beckert et al. | |
| 6,028,537 A | 2/2000 | Suman et al. | |
| 6,032,089 A | 2/2000 | Buckley | |
| 6,154,152 A | 11/2000 | Ito | |

OTHER PUBLICATIONS

Abstract for Japanese patent entitle "Electronic Processing System for Equipment Mounted in Vehicle," publication No. 10297392, published Nov. 10, 1998.
Abstract for Japanese patent entitled "Instrument–Panel Image Production Apparatus for Vehicles," publication No. 10297319, published Nov. 10, 1998.
Lind et al., "The Network Vehicle—A Glimpse into the Future of Mobile Multi–Media," © 1998 IEEE, pp. 1–8.
Jameel et al., "Web on Wheels: Toward Internet–Enabled Cars, " © 1998 IEEE, pp. 69–76.
Jameel et al., "Internet Multimedia on Wheels: Connecting Cars to Cyberspace," © 1998 IEEE, pp. 637–642.
Jini™ Architectural Overview, © 1999 Sun Microsystems, Inc., pp. 1–23.

* cited by examiner

Primary Examiner—William A. Cuchlinski, Jr.
Assistant Examiner—Gertrude Arthur
(74) Attorney, Agent, or Firm—Conley, Rose & Tayon, PC; B. Noël Kivlin

(57) ABSTRACT

An architecture for components of a vehicle, wherein the architecture facilitates the upgrading, replacement, removal or addition of the components in the vehicle. In one embodiment, a network is installed in the vehicle, wherein the network comprises a transmission medium and one or more network devices coupled thereto. The network devices are addressable using IP addresses or object terminology. The network devices may be configured to determine the capabilities of other devices, or they may be configured to look up the services provided by devices on the network, and they may utilize these services and capabilities themselves. The network devices are not constrained to use predetermined designs or interfaces which may be necessitated by the use of proprietary buses or connections. The network devices may be automatically integrated into the network using a discover-and-join protocol and may easily be removed from the network.

22 Claims, 4 Drawing Sheets

UPGRADABLE VEHICLE COMPONENT ARCHITECTURE

BACKGROUND OF THE INVENTION

1. Field of the Invention

This invention relates generally to the field of computerized systems for automobiles and other vehicles and more particularly to a vehicle component architecture in which vehicle components are network devices coupled to an in-vehicle network.

2. Description of the Related Art

Automobiles play an important role in the lives of millions of people. They provide a mode of transportation which allows people to cover great distances quickly and easily and are a convenience which many people could not do without. For example, many people commute to and from work every day in their automobiles and some may spend an hour or more in traffic each way.

Despite the freedom with which automobiles allow people to move about, the substantial amount of time which people spend in their automobiles may also be an inconvenience. For instance, a person who commutes an hour each way to and from work typically cannot make productive use of that time. That is, time which is spent in the automobile might have instead been spent working, playing or in some other useful manner. Although some people may be able to make use of cellular phones to conduct business from their automobiles, they make up a relatively small percentage of the driving population. Time spent in an automobile is more typically an interruption of the driver's normal activities. The inconvenience and anxiety resulting from this interruption may be magnified by problems such as traffic jams, vehicle malfunctions and driver confusion.

Automobile designers may attempt to lessen the inconvenience of time spent in automobile by making it as comfortable as possible and by providing certain services to the occupants of the vehicle. For example, the ergonomics of the automobile are studied to ensure that it provides both a physically comfortable environment and a user-friendly interface to the automobile's functions. The designers may also incorporate into the vehicle the delivery of services that may assist the driver, thereby reducing the driver's workload and anxiety level. Such services may include providing computerized maps, navigation aids and emergency assistance signaling.

One of the difficulties faced by designers, however, is that the designs for automobiles must be finalized long before the vehicles themselves actually go into production. The designers must therefore anticipate needs which drivers will have several years in the future. Since a typical design cycle for an automobile is four years long, the designers must create an automobile design which is four years ahead of its time. Then, after the automobile is in production, even services which designers may have accurately anticipated may quickly become outdated or obsolete. Because a person may own an automobile for ten years or more, it is not at all unusual for the design of an automobile to be outdated for a substantial portion of its useful life.

While it may be desirable to upgrade the components of automobiles, they are often difficult, if not impossible, to upgrade. The components typically have unique physical and functional characteristics, including their size, shape and interface to the automobile, which prevent them from being replaced with similar, but not identical parts. Further, the replacement of the components can be very labor-intensive, and it is not unusual for the cost of the labor to install the components to be on the same order as the cost of the components themselves. There is therefore no practical way in the prior art for an automobile which is already in production to be upgraded to maintain state-of-the-art components and/or functionality.

SUMMARY OF THE INVENTION

One or more of the problems described above may be solved by the various embodiments of the invention. Broadly speaking, the invention comprises a system for integrating components into a vehicle wherein the components comprise devices coupled to an in-car network and wherein the network provides for easy re-configuration and upgrading of the vehicle, as well as improved communication of information between the vehicle's systems and integration of the vehicle network into external networks.

One embodiment of the invention comprises a vehicle which has a network installed therein. The network includes one or more devices which are addressable using IP addresses or object terminology. The devices may include various servers and clients, such as microphones, cameras, GPS receivers, interfaces to on-board diagnostic systems, communication devices, displays, CD players, radios, speakers, security devices and LANs (local are networks,) to name only a few. Devices may easily be connected or disconnected to upgrade or reconfigure the vehicle's systems, and software and services can easily be provided to the various devices through the network. The network can enable the interaction of various network devices to increase the capabilities or utility of devices which may otherwise be limited. The system therefore provides an easy and inexpensive means to improve or otherwise modify the functionality of the vehicle.

In one embodiment, the in-vehicle network comprises an ethernet, although other embodiments can be implemented in any other type of network. Communication devices such as wireless modems and wireless ethernet allow communications with devices and networks external to the in-vehicle network so that data, software, services and other information can be downloaded from or uploaded to these external sources. The in-vehicle network can also be coupled to an external network through these communication devices so that it can function as a device (a sub-network) on the external network.

In one embodiment, some traditional vehicle components maybe replaced by network devices, thereby providing extended functionality to the driver. For example, the vehicle's dashboard maybe replaced by a monitor which displays images of dashboard instruments, vehicle data and other information to the driver. Graphics generated by a server on the network may be designed to emulate digital or analog gauges which are normally found on a dashboard. The graphics may be varied to suit the preferences of different drivers, or the driver may be able to select different information to be displayed (for example, tabbing from vehicle data to location information, to a radio display, and so on.)

Additional embodiments are described below.

BRIEF DESCRIPTION OF THE DRAWINGS

Other objects and advantages of the invention will become apparent upon reading the following detailed description and upon reference to the accompanying drawings in which.

Figure 1:
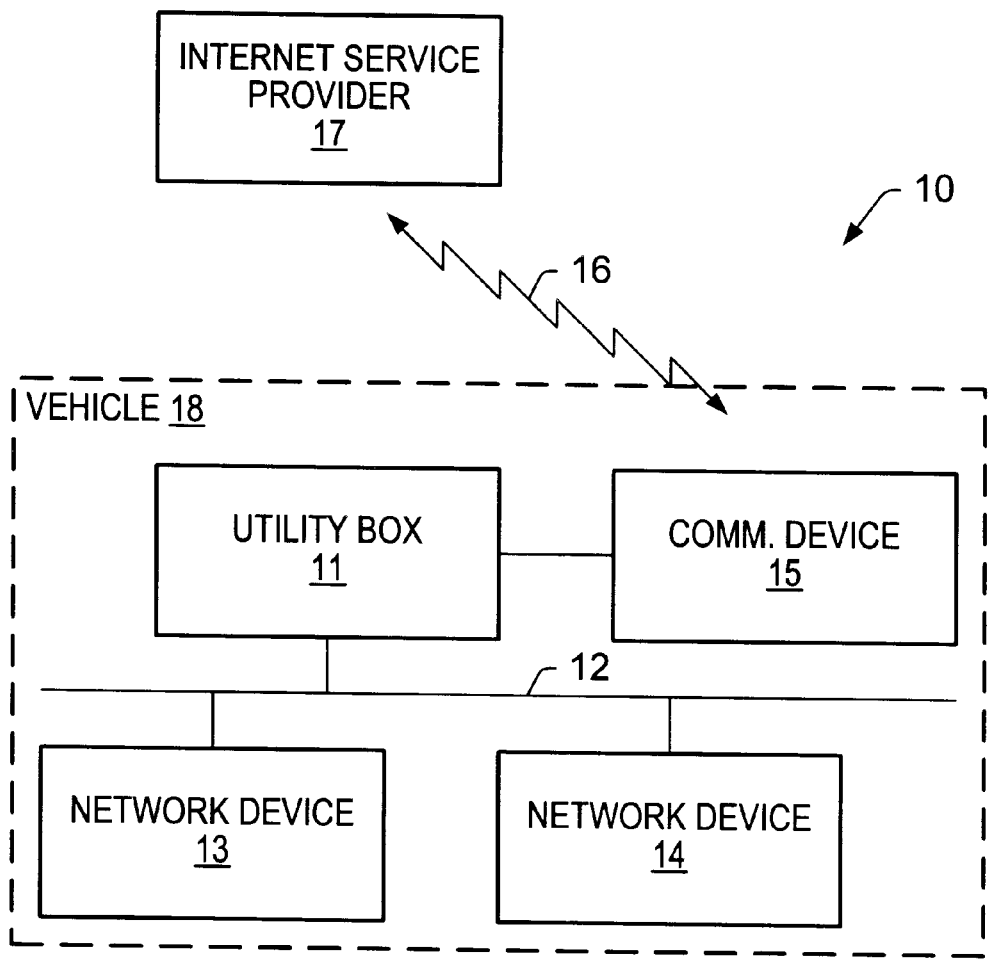
FIG. 1 is a block diagram of an in-car sub-network in one embodiment of the invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

One embodiment of the invention will be described in detail below. It should be noted that many modifications of the described embodiment are possible and will be obvious to a person of ordinary skill upon reading this disclosure. While some of these modifications will also be described below, all of the various embodiments of the invention are intended to be encompassed by this disclosure and the appended claims.

One embodiment of the invention comprises an automobile which incorporates its own network. A group of components within the automobile comprise network devices which are coupled to the in-car network. Thus, rather than being directly and independently coupled to the automobile, these components are citizens of the in-car network and may be installed, disconnected, upgraded or replaced with different devices. They may increase or decrease the functionality of the automobile, or they may function cooperatively with other network devices. Thus, the components are not limited by outdated designs or the constraints of proprietary buses or connections.

As used herein, "network" refers to a group of computers or other devices (e.g., servers, displays, modems, etc.) which are interconnected by a transmission medium, and which are addressable using IP addresses or object terminology. A network may be one of many different types, several of which are defined in the standards of the Institute of Electrical and Electronics Engineers (IEEE.) For example, one embodiment of the invention employs an ethernet (as defined IEEE 802.3.) Because network types such as ethernet, token ring and others are well known and understood in the art of the invention, they will not be explained in detail here. Suitable transmission media (e.g., twisted pairs of wires, coaxial cables, optical fibers, free space or even the connections between devices and their peripherals) can be selected according to the selected network architecture. A wide variety of network devices can be coupled to a network and the network can typically be dynamically reconfigured through connection and/or disconnection of these devices.

IP (Internet Protocol) is a protocol which is typically used in conjunction with TCP (Transport Control Protocol) as a protocol suite for passing data from applications to networks and then from the networks to other applications. The IP portion of the protocol suite is used in transporting packets from the transmitting device to the receiving device. IP addresses are, of course, the means by which the packets are directed to the target device. Because IP addresses are well-known in the data-processing arts, they will not be explained in further detail here. It is sufficient to note that IP addressing allows data to be directed to devices which are not part of a predetermined, hard-wired design. "Object terminology," as used in this disclosure, refers to software language which handles devices in an object-oriented manner. That is, the devices and their functions can be used in a manner which is not dependent upon the specific implementation of the device, but instead upon the type and functions of the device. For instance, as will be explained below in regard to Jini software, a device which joins a network may register its services with a lookup server so that other devices which need these services can request them without regard to the specific device that provides them. In contrast, prior art on-board diagnostic buses have specific, predetermined devices which provide specific, predetermined services and which transmit/receive data over a specific, predetermined path. By using IP addressing and object terminology to provide communication between devices on the network, the invention eliminates the constraints which are inherent in bus systems. (Communication, as used here, includes data transfer and any other interaction between the devices.)

For the purposes of this disclosure, a network is distinct from the various buses which may monitor the functions of an automobile and provide diagnostic information, but which can be coupled only to specific monitoring devices. These buses may be referred to as "on-board diagnostic" (OBD) systems. Because the Environmental Protection Agency has adopted standards for such systems from the standards of the society of automotive engineers (SAE), most of the diagnostic buses use command sets and protocols defined by SAE standards (e.g. SAE J2979 and SAE J. 2850 VPW/PWM.) OBD systems do not provide IP addressability. Consequently, they do not, in the absence of the invention, support the wide variety of devices that can be coupled to a network. The utility of OBD system buses is limited to specific diagnostic functions which are designed into the automobile. It is contemplated, however, that embodiments of the invention may be implemented by adding an IP layer on top of the OBD buses. Thus, while the proprietary buses are distinct from the networks described herein, these buses may be converted to network uses, or they may be coupled to the networks through appropriate interfaces (i.e., the buses themselves can function as devices on the networks.)

In another embodiment of the invention, an automobile having an in-car network may be coupled to an external network. That is, the in-car network may appear to the external network to have a single IP address. (In this context, the in-car network may be referred to as a "sub-network," while they external network may be referred to as the "primary" network.) The automobile sub-network may include a variety of communication devices through which it may be coupled to the primary network. These devices may include a wireless modem, a cellular packet data (CDPD) modem, a pager or other communication devices. The in-car sub-network operates in cooperation with a land-based proxy server. Because the in-car sub-network uses several different communication devices, it has several different IP addresses (one for each of the communications devices.) These addresses may be dynamically assigned by a service provider. The in-car sub-network communicates to the land-based proxy server of the IP address of the currently-used communication device. Packets which originate on the primary network and which are addressed to the in-car sub-network are directed to the land-based proxy server, which then directs the packets to the in-car sub-network at the appropriate IP address. The land-based proxy server additionally acts as a buffer when the in-car sub-network is disconnected from the primary network. The land-based proxy server forwards packets which are destined for the disconnected in-car sub-network and delivers the packets when the in-car sub-network is reconnected to the primary network.

The goals of the system can be grouped into three broad categories: hardware independence; service delivery; and software upgradability. The hardware independence of the system is related to the interchangeability of the components of the automobile's sub-network. If, for example, the sub-network includes a graphical display, this display should be replaceable with several different displays, each having unique characteristics. The several displays only need to be able to interface with the sub-network in order to be exchanged. The goal of service delivery relates to the ability to provide new and different services to the vehicle through the sub-network. Although automobiles in the prior art may provide one or two services to the driver, e.g. driver assistance via automatic telephone communications, the equipment for providing these services are dedicated to their respective services and cannot provide distinctly different services. The present system, on the other hand, allows new components or new software to be added to the automobile sub-network and thereby enables new services to be provided to the driver. Finally, software upgradeability relates to the ease with which software systems in the automobile may be upgraded via the automobile sub-network. Rather than manually replacing memory modules or CDs (e.g. containing map data,) the automobile sub-network enables the downloading of new applications or data, as well as the uploading of vehicle diagnostic data or other information, through the network communication devices.

This disclosure is directed generally to sub-network implementations within vehicles. "Vehicles" may include automobiles, boats, airplanes, trailers, buses, trains and the like. For the sake of brevity, the detailed description herein describes an implementation in an automobile. The scope of the invention, however, is intended to encompass any type of vehicle, and references to automobiles or cars apply equally to other vehicles. Additionally, at least portions of the system are also applicable to land-based implementations of sub-networks, rather than being limited to vehicle-based implementations.

Referring to FIG. 1, an in-car sub-network 10 in one embodiment of the invention is shown. In-car sub-network 10 comprises a utility box 11, network devices 13 and 14, communication device 15 and network cabling 12. These components are installed in vehicle 18. Utility box 11 and network devices 13 and 14 are coupled to cabling 12. Communication device 15 is connected to utility box 11. Each of these devices is addressable on network 10. Although communication device 15 is not directly connected to cabling 12, utility box 11 is configured to recognize packets on the network which are addressed to communication device 15 and to forward these packets to the device. Network 10 can be coupled to an external network through internet service provider 17. In the embodiment depicted in FIG. 1, communication device 15 is a wireless device and is coupled to internet service provider 17 by wireless transmissions 16.

In one embodiment, the in-car sub-network is installed in a General Motors EV1. The EV1 is an electric car which General Motors markets through its Saturn dealerships. The EV1 was selected for this embodiment in part because of the energy requirements of the devices connected to the in-car sub-network. Although many vehicles can provide sufficient power to run the devices, the EV1 has large batteries for providing energy to the car's original equipment. These batteries can power the devices of the in-car sub-network for a longer period of time than the smaller batteries which are found in most vehicles. Thus, the in-car sub-network can be installed in essentially any type of vehicle.

Figure 2:
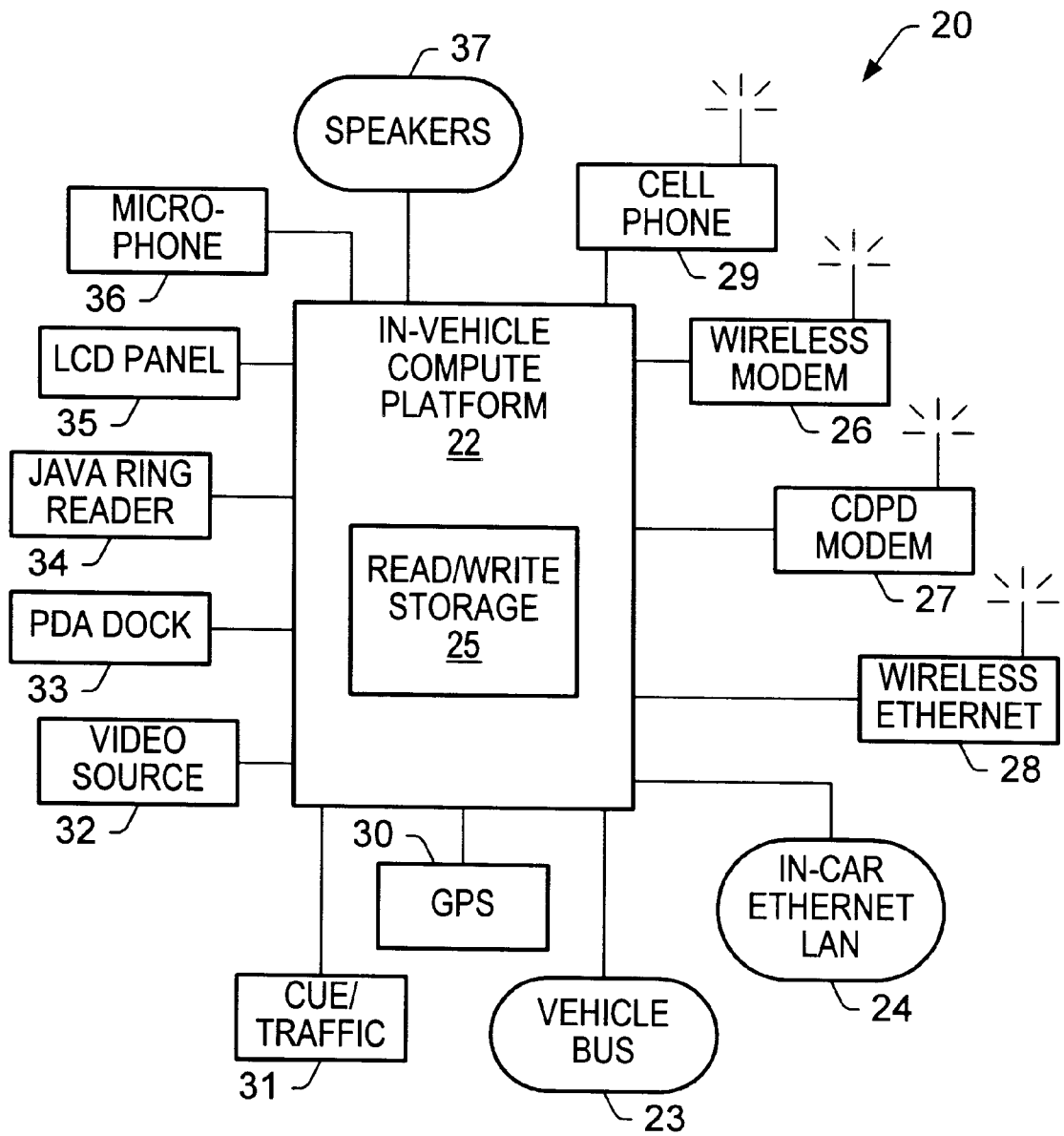
FIG. 2 is a detailed block diagram of an in-car sub-network in one embodiment of the invention.

Referring to FIG. 2, a more detailed block diagram of in-car sub-network 20 is shown. FIG. 2 illustrates some of the components that may be coupled to the network. In-car sub-network is built around an on-board compute platform 22. Compute platform 22 consists of a SparcStation UPN server (a prototype Sparc 5-based system.) All of the components of the in-car sub-network are either directly plugged into the compute platform or coupled to do it via an ethernet connection.

Compute platform 22 includes some type of readable/writeable storage media 25, such as a hard disk or flash memory. As mentioned above, the manufacturer's on-board diagnostic system bus 23 can be coupled to the in-car sub-network. On-board diagnostic system bus 23 is connected to compute platform 22 via an RS-232 connector. The in-car sub-network can also be coupled to an in-car ethernet LAN 24 via the ethernet itself. The in-car sub-network can also be connected to external networks via a set of communication devices. These communication devices include wireless modem 26, CDPD modem 27, cellular phone 29 and wireless ethernet 28. Depending upon the circumstances in which the in-car sub-network is operating, the external network connection may be provided by any one of these communication devices. The in-car sub-network is configured to select one of the devices according to the prevailing operating conditions.

The communication devices identified above (i.e., wireless modems and ethernet transceivers) are typical for network communications. In addition to these devices, however, the in-car sub-network may utilize devices that provide "last-hop" service. Communications from a node on a first network to a node on a second network are typically routed through a number of intermediate networks. Packets may "hop" from the first network to an intermediate network, and then to another network before arriving at the second network. Last hop service is the service that transmits the packets over the last segment of this data path. Because any one of the communication devices of the in-car sub-network may lose communications with the ISP (or other external device,) it is advantageous to have as many possible means for communicating as possible. The in-car sub-network may therefore employ last hop service comprising paging or similar types of communications. These services will typically be used by transmitting packets to a last hop service transmitter, which will convert the packet data as necessary to make the last hop (e.g., convert the data to text for an alphanumeric pager,) then transmit the data to the in-car sub-network.

In-car sub-network 20 can also communicate with external systems such as global positioning systems (GPS) and traffic information systems. A GPS receiver 30 is coupled to in-car sub-network 20 for providing automobile location information. GPS receiver 30 is capable of collecting information from GPS satellites to determine the position of the automobile. This information is converted to a format appropriate for other uses within the in-car sub-network, such as map retrieval for the area around the automobile. A Cue traffic information receiver 31 is also coupled to in-car sub-network 20. Receiver 31 obtains traffic information (e.g., information on traffic jams) which can be used, for example, by navigation systems running on in-car sub-network 20 to determine the best route for the automobile to take. Both GPS receiver 30 and traffic information receiver 31 are connected to compute platform 22 by RS-232 connectors.

In one embodiment, in-car sub-network 20 includes video camera 32. Video camera 32 provides visual information from the automobile's surroundings to in-car sub-network 20. Video camera 32 provides a good example of the utility of a network device. Because video camera 32 is a network device, other devices on the in-car sub-network, or even devices on external networks which are coupled to the in-car sub-network, can request this visual information. For example, the video produced by video camera 32 may be displayed by LCD panel 35 or by a web browser coupled to the in-car sub-network through PDA dock 33. A person browsing the internet on an external network could also request images from video camera 32.

In one embodiment, in-car sub-network 20 also includes PDA (personal digital assistant) dock 33, Java Ring reader 34, LCD panel 35, microphone 36 and speakers 37. PDA dock 33 provides a means for passengers in the automobile to connect a PDA to the in-car sub-network. Other embodiments of the invention may include a dock for a laptop computer instead of, or in addition to, PDA dock 33. Java Ring reader 34 is coupled to in-car sub-network 20 to provide a means for controlling access to the network and the functions of the automobile itself. Java Ring reader 34 essentially performs a password function. That is, it identifies a user of the in-car sub-network and provides a particular level of access to network components according to the privilege level of the user. For example, the owner of the automobile may be allowed to access substantially all of the components and functions of the in-car sub-network except for detailed vehicle diagnostic information. A mechanic, on the other hand, may be allowed to access this detailed diagnostic information, but may only be allowed to drive the automobile a limited distance. This mechanism may also be used to personalize the operation of the automobile, adjusting seat positions, radio stations and the like according to the preferences of different drivers. The extent to which this mechanism controls the various functions of the automobile depends, of course, upon the coupling of the related automobile components to the in-car sub-network.

Microphone 36 and speakers 37 are coupled to in-car sub-network 20 in order to provide, among other things, a mechanism for speech communications between the driver and the network. In one embodiment, compute platform 22 includes a speech engine for converting speech to text or commands. The driver of the automobile may therefore control various functions of the network and/or the automobile using spoken commands. For example, the driver may simply recite the appropriate command for determining the location of the automobile, whereupon compute platform 22 might query GPS receiver 30 for location information, then retrieve a map from a web site and display the map to the driver. Compute platform 22 may also include a text-to-speech engine for use in delivering information to the driver. For example, the in-car sub-network may retrieve the driver's email or other documents, convert the text to speech and then "read" the document to the driver.

It is contemplated that the vehicle's OBD (on-board diagnostic) system (e.g., item 23 in FIG. 2) will be connected to in-car sub-network 20. The OBD system, as indicated above, is typically of a proprietary design which was not originally intended to be connected to a network. The OBD system may therefore be connected to the network by an interface which is designed as a network device. With the OBD system coupled to the network via the interface device, other devices on the network can query the OBD system for diagnostic information and/or provide information to the OBD system.

Although the in-car sub-network depicted in FIG. 2 includes the particular network devices described above, the enumerated devices are intended to be illustrative rather than limiting. In other embodiments, the network may include printers, compact disk (CD) drives, storage devices, digital video disk (DVD) players, video games, monitors or other devices. The network may include any type of network devices that may be installed in the automobile or remotely connected to the network through its communication devices. Because the network supports any network device, components which were not designed, nor even conceived, when the network itself was installed can be easily coupled to the network and operated cooperatively with the remainder of the network devices.

As indicated above, compute platform 22 is at the center of in-car sub-network 20. In one embodiment, compute platform 22 is a Java platform. (Java is a trademark of Sun Microsystems, Inc.) In other words, compute platform 22 uses the Java programming language to provide an environment in which Java applications can be executed. The use of a Java environment in compute platform 22 allows the software that will be executed on the compute platform to be hardware independent.

Figure 3:
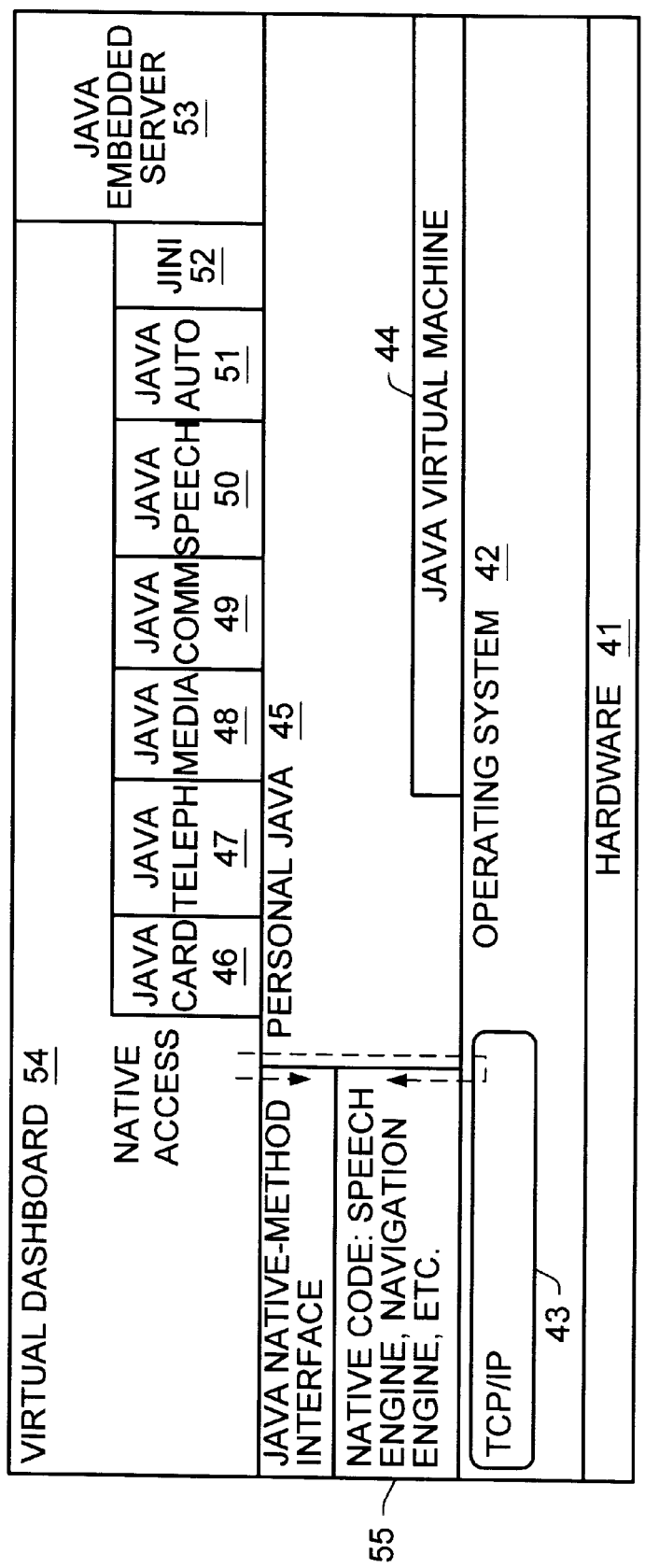
FIG. 3 is a diagram of the operating environment of the server in one embodiment of the invention.

The organization of the operating environment of compute platform 22 is shown in FIG. 3. At the lowest level of the diagram shown in FIG. 3 is hardware 41. Hardware 41 comprises the physical server (or other processor) on which the software is executed. Hardware 41 may comprise a SparcStation as in the above-described embodiment, or any other suitable computer, such as a StrongARM, PowerPC, Intel, MIPS or Mitsubishi system. Hardware 41 executes an operating system 42 which provides the basic functionality of the compute platform. The particular operating system selected to be used with hardware 41 will depend upon the type of processor upon which hardware 41 is built, and may also depend upon the network's requirements, if more than one operating system is available for the chosen hardware. A few of the operating systems which may be available are VxWorks, PSOS, OS9, Chorus and Linux. Operating system 42 supports Transport Control Protocol/Internet Protocol (TCP/IP) 43. Each of the devices connected to the in-car sub-network can therefore be addressable as a network device.

Compute platform 22 runs Java virtual machine 44. Java virtual machine 44 is a software application that executes in the environment of the native operating system and provides a common environment for applications written in the Java programming language. In other words, Java virtual machine 44 provides a layer of abstraction between an operating system and an executable program, essentially providing a Java-to-operating system interface so that programs written in the Java programming language can be executed on a platform running an operating system which would not otherwise support execution of the program. Because Java virtual machines exist for many different compute platforms, the same Java language program can be executed on each of these different platforms. In this manner, the hardware/operating system portion of the system is made a commodity. As a result, the remainder of the system is no longer tied to the original hardware, the original operating system, or the original supplier thereof In the embodiment shown in FIG. 3, compute platform 22 executes Personal Java 45 on Java virtual machine 44. (Personal Java 45 also interfaces to some extent with operating system 42.) Personal Java is an application environment which was specifically designed for consumer devices such as PDAs, set-top boxes, smart phones and other mobile, hand-held devices. These consumer devices differ from desktop computers in that they typically use different interface technologies, they have much smaller memories, they use embedded processors and they have tight constraints on power consumption, among other things. Personal Java is designed to provide an environment which eliminates these constraints and which facilitates the use of network-connectable applications for these consumer devices. Personal Java is therefore well-suited to operate within the constraints of the in-car sub-network. Personal Java includes a subset of core Java application programming interfaces (APIs) and a set of APIs which are directed specifically to features required by consumer applications in resource-limited environments. (Personal Java implementations often include a Java virtual machine, so Java virtual machine 44 may therefore be considered part of Personal Java 45.)

In the embodiment illustrated in FIG. 3, several APIs are made available in the environment provided by Personal Java 45. These APIs include Java card 46, Java telephony 47, Java media 48, Java communications 49, Java speech 50, Java automotive 51, Jini 52 and Java embedded server 53. These applications are exemplary of the applications and applets that can be employed and many others can be used with, or instead of, these applications. Applications 46–51 will be described in more detail below in connection with the operation of the system. A virtual dashboard application 54 operates cooperatively with these applications and provides an interface between the applications and the vehicle's driver. Virtual dashboard 54 may also interface directly with Personal Java 51 and with native code 55. Native code 55 may include native (rather than Java) equivalents of applications 46–51.

The embodiment of the invention illustrated in FIG. 3 incorporates Jini software 52. Jini is a technology developed by Sun Microsystems to allow devices to form impromptu communities on networks. (Jini is a trademark of Sun Microsystems, Inc.) In other words, the devices can become aware of each other and share each other's services even though they do not have any prior knowledge of each other. Jini software 52 is an application which implements the Jini technology. Using Jini technology, devices can spontaneously form network communities through a discovery-and-join protocol. When a device using a discovery-and-join protocol is plugged into a network, the device polls the network for a Jini lookup service. The device then registers itself with the lookup service. Once the device has registered itself with the lookup service, any other device on the network may query the network server to determine whether desired services are available. Because this process is automatic, users need not perform complicated installation procedures to couple Jini-enabled devices to the network and enable the devices to function cooperatively with other devices on network. Jini technology also employs a concept known as "leasing." Whenever a device registers with a lookup server, the device can be thought of as having a "lease" which must be periodically renewed. If the "lease" is not renewed within a predetermined period, the lookup server assumes that the device has been disconnected and removes the information associated with the device. Disconnection of devices is therefore also automatic, so that the user is not required to perform any de-installation procedures.

Although Jini technology is used in the embodiment described above, other embodiments may not include a Jini application. Embodiments which do not implement Jini technology may, if desired, implement similar functionality (e.g., a discover-and-join protocol) through other means. For example, a device may include an on-board memory which contains information on the services it provides or the services it needs to be able to perform all of its functions. The memory may also contain a web address at which this type of information may be found. The network server may then look up the information on the device using this web address. The device and/or its services may thereby be registered in a manner similar to that of a Jini network.

The embodiment of FIG. 3 uses Java embedded server 53 to provide services to the in-car sub-network. Java embedded server 53 is a "small footprint" server which requires only a limited amount of memory. Java embedded server 53 includes a set of APIs for management of "plug and play" services and applications, and a set of services which are managed, such as HTTP, SNMP, logging, thread management, remote administration and servlet support. (A "servlet" is an applet designed to provide a service to the network.) More complex services such as email and facsimile can be built on top of the embedded server's services. Because of the small footprint of Java embedded server 53, it is well-suited for use in the in-car sub-network. Java embedded server 53 allows the services which are provided to be upgraded or otherwise modified, whereas services provided by many embedded servers are "hard wired" into them, thereby limiting their capabilities and their upgradability.

Java speech module 50 (and possibly native code 55) provide a speech interface between the user and the in-car sub-network. Because the user may also be the driver of the vehicle, it may be important to focus the user's attention on driving rather than providing input to one or more network devices. Providing this input through speech is both safe and convenient. The user's spoken input can be converted to textual (or equivalent) input by speech engines in either module 50 or native code 55. Similarly, output of one more network devices may be converted to speech so that the user can hear the output rather than having to look at a display device. The in-car sub-network may also be configured to provide information to the user as a combination of speech and other types of information (e.g., graphics.)

Virtual dashboard application 54 is an application that generates a graphical display similar to a conventional automobile dashboard. Virtual dashboard application 54 is used in conjunction with a monitor which is coupled to the in-car sub-network (e.g., LCD panel 35 shown in FIG. 2.) The monitor and associated software may be referred to as a "virtual dashboard" or a "software dashboard." In one embodiment, the monitor of the virtual dashboard is mounted directly in front of the vehicle's driver (i.e., where the speedometer would normally be located.) The graphics generated by virtual dashboard application 54 may include images of a speedometer, odometer, fuel gauge and/or other instrumentation. It should be noted that the graphics generated by virtual dashboard application 54 define the manner in which the information is presented (e.g., analog vs. digital readouts, color schemes, etc.) rather than simply generating a value (e.g., speed) which is then displayed in a predetermined manner (e.g., two-digit speedometer display.) The virtual dashboard is therefore distinct from prior art digital displays.

Because these graphics are generated by virtual dashboard application 54, they may be customized in a number of ways. They may display a particular subset of available information or they may display the information according to a particular style to match the vehicle's interior. The graphics generated by virtual dashboard application 54 may also be customized for different users so that, when a first person is driving, the information is displayed in a first arrangement and, when a second person is driving, the information is displayed in a second arrangement. These different display modes (corresponding to the different sets of information or the different styles) can be user-selectable. The user can select one of the modes using voice commands or by manually selecting a mode (e.g., by using a touch-sensitive screen.)

In other embodiments, similar software applications and monitors can be used to generate graphics for other equipment such as console displays, radio controls, air conditioning controls and the like. Other embodiments may also utilize independent processors and memories to generate graphics for the monitors rather than having the graphics generated by an application executing on the server.

Figure 4:
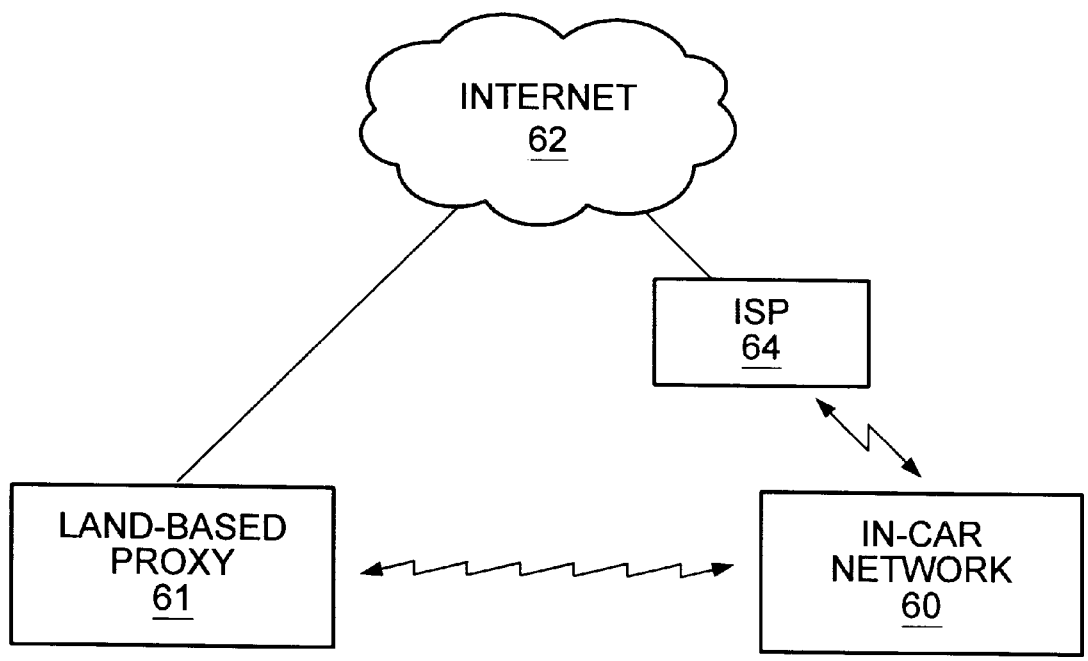
FIG. 4 is a diagram illustrating the operation of an in-car sub-network in conjunction with a land-based proxy server and external networks in one embodiment of the invention.

Referring to FIG. 4, the operation of the in-car sub-network in connection with a primary network is illustrated. In-car sub-network 60 is in communication with both land-based proxy server 61 and internet service provider (ISP) 64. ISP 64 is in turn connected to the internet and, consequently, all networks connected thereto (which will be collectively referred to herein as primary network 62.) Communications between in-car sub-network 60 and primary network 62 may be routed directly between the two networks (via ISP 64,) or they may be routed through land-based proxy server 61, depending on the circumstances surrounding the communications. (It should be noted that, although the proxy server in this embodiment is land-based, this is not a requirement of the system. The proxy server is intended provide a communications link to the primary network which is less likely to be disconnected than the communication devices of the in-car sub-network.)

As described above, in-car sub-network 60 may include several different devices (e.g., a wireless modem) for communications external to the in-car sub-network. In-car sub-network 60 can switch between these devices as necessary to maintain communications. That is, the network is configured to establish communications using one of the devices and, if at some point communications using this device are no longer possible, to switch to another one of the devices and attempt to re-establish communications using the new device. Because each of these communication devices has a different IP address associated with it, some action must be taken to allow devices in the primary network to properly address packets which are targeted for the in-car sub-network. This can be handled in several different ways.

If communications are expected to take place quickly, the in-car sub-network can operate in a first mode in which it can communicate directly to the primary network, and the primary network can respond directly to the in-car sub-network. In other words, packets originating at the in-car sub-network can be addressed using the IP address of the target node on the primary network, and packets originating at the primary network can be addressed using the IP address of the in-car sub-network (i.e., the IP address of the currently-used communication device.) Just as with a typical, land-based network connection, the transmissions between the in-car sub-network and the primary network are routed to the internet through the ISP. These direct communications should be sufficient because, over the short term, the communication device which is currently being used by the in-car sub-network is not expected to lose contact with the primary network. Over the long term, however, it is expected that communications will occasionally be lost, and that they will subsequently have to be re-established.

As an example of a long-term situation, it may be desirable for the in-car sub-network to have a single email address. Because of the fact that the in-car sub-network may use several different IP addresses (each corresponding to a different communication device,) that email address cannot be associated with an IP address corresponding to one of the in-car sub-network's communication devices. In this situation, the system operates in a second mode in which communications from the primary network to the in-car sub-network are routed through the land-based proxy server, which has a single IP address that can be associated with the email address. The land-based proxy server, which keeps track of the current IP address of the in-car sub-network, can buffer email messages (if necessary) and forward them to the in-car sub-network when the land-based proxy server is in communication with it.

There may also be situations in which it is desirable to use a hybrid scheme to communicate between the in-car sub-network and the primary network. For example, when a device on the in-car sub-network is retrieving web pages, the communications are relatively short-term and may proceed directly between the in-car sub-network and the web site. It may be desirable, however, to employ some means for transforming the communicated data (e.g., web pages) to make more efficient use of the bandwidth of the in-car sub-network (e.g., by removing advertisements or images from some of the pages.) This function can be performed by the land-based proxy server. Thus, in a hybrid mode of operation, some of the communications are direct while others are routed through the land-based proxy server.

Whenever the in-car sub-network establishes communications with the ISP or land-based proxy server, it identifies the IP address of the currently-used communication device to the land-based proxy server. When the in-car sub-network becomes disconnected from the external network (e.g., when the currently-used communication device loses service,) the land-based proxy server becomes aware of the fact that the in-car sub-network is disconnected and cannot receive packets. The land-based proxy server maintains an awareness of whether the in-car sub-network is connected through periodic communications between the two. The in-car sub-network periodically sends messages to the land-based proxy server in the same manner that devices renew their "leases" on a Jini-enabled network. It is further contemplated that the land-based proxy server may periodically query the in-car sub-network. As explained above, when the in-car sub-network is not in communication with the land-based proxy server and primary network, the land-based proxy server may act as a buffer and store the packets targeted for the in-car sub-network for later delivery. When the in-car sub-network is able to re-establish communications through one of its communication devices, the land-based proxy server identifies the IP address of the device with which communications were re-established and delivers the stored packets to the in-car sub-network using this address.

It should also be noted that the in-car sub-network can operate in a third mode in which it can communicate with the land-based proxy server directly rather than through the ISP. As indicated above, one embodiment of invention includes a wireless ethernet communication device. When the in-car sub-network is within range of the land-based proxy server, a wireless ethernet connection may be established between the two. When it joins the land-based proxy server's LAN, the in-car sub-network can communicate directly to the land-based proxy server on the LAN, or it can communicate with other networks through the LAN's connection to the internet. As will be explained in more detail below, the in-car sub-network can join other networks as well using the wireless ethernet device.

In order to make fall use of the devices connected to the in-car sub-network, they must be able to communicate with devices on other networks. The in-car sub-network's devices must therefore have IP addresses to which the other devices can send packets. Several factors, however, make it impractical to assign an IP address to each device that is connected to the in-car sub-network. First, there is a large number of devices which may be connected to the in-car sub-network (it is contemplated that virtually all of a vehicle's components may in time be configured as network devices,) and this number must be multiplied by the number of vehicles in which in-car sub-networks may be installed. Further, as indicated above, one device which may be connected to an in-car sub-network is another sub-network (see FIG. 2, item 24.) Thus, the in-car sub-network, which is a sub-network relative to the primary network, may in turn have sub-networks connected to it so that there are networks within networks, within networks (and so on.) These nested networks are sometimes referred to as fractal networks because a device on a network may, upon closer examination, itself be a network (and so on.)

It is therefore useful to employ a technique known as network address translation. In network address translation, one device on a first network serves as a proxy through which devices on the first network communicate with other networks. To the other networks, the first network therefore appears to be a single device (the proxy device.) Relative to the other networks, only one IP address is needed for the first network because it appears to be a single device. Although devices on the first network have IP addresses within the network, packets which are directed outside the first network are conveyed to the proxy device, which wraps them in another packet having the IP address which is represented to the other networks. The first-network IP addresses are translated to port numbers which are used in the externally represented IP address. Just as the networks themselves can be nested within each other, network address translation can be used recursively to wrap IP addresses within IP addresses (and so on.)

As indicated above, the configuration of the vehicle components as network devices on an in-car sub-network simplifies installation and removal of the devices, hence re-configuration of the vehicle. This system thereby makes it possible to remove outdated components and replace them with new components, even though the new components may have different features or require different data or other signals from the vehicle or its components. Similarly, components which execute associated software, display data or provide services can be upgraded by downloading new software, data or services ("upgrade data") to the components through the in-car sub-network. This software may be quickly and easily retrieved from sources external to the in-car sub-network, such as web pages or LANs which can be accessed through the communication devices on the in-car sub-network. The software can be retrieved by one device (e.g., a wireless modem,) conveyed through the network and installed in a second device (e.g., a GPS locator) as easily as downloading a web page. The system thereby provides a great deal of flexibility in the hardware and software configurations of the vehicle. In contrast, prior art systems for providing in-car services are tightly coupled to the car manufacturer's choice of hardware and operating system. Changes to the hardware require substantial time, labor and expense. Changes to the software require the original software supplier to provide modified code. The use of Personal Java in the in-car sub-network provides platform independence and also eliminates a substantial portion of the labor, time and costs involved in replacing and upgrading the vehicle's components and functionality.

In addition to increasing the upgradability of the vehicle, the in-car sub-network extends the capabilities of individual components coupled to the network. While network devices are often configured with their own processors, the in-car sub-network can eliminate the need for these processors and thereby reduce the cost of the individual components. Further, devices which may only be capable of accepting information and displaying that information may be coupled to the in-car sub-network and allowed to utilize the processing power of other components on the network. Still further, devices which are not IP-addressable (or object-terminology-addressable) in a stand-alone configuration can appear to be IP-addressable (or object-terminology-addressable) to other devices or networks. (It should be noted that, for the purposes of this disclosure, devices which appear to be IP-addressable or object-terminology-addressable are considered to actually be IP-addressable or object-terminology-addressable, respectively.)

As an example, a simple digital display may be configured to receive a signal defining a value (e.g., the speed of the vehicle) and to display the digits corresponding to that value. Although this display may not be capable of querying the vehicle for the value to be displayed or recognizing packets on the in-car sub-network which contain the information, a piece of software may be executed on a server's processor to perform this function. The software may cause of the server to recognize packets which contain the appropriate information and redirect this information to the display, which only needs to receive and display the information.

It is contemplated that a component that utilizes the capabilities of other devices on the network (such as the display) could include a memory which stores the software which enables the component to function in this manner and passes it on to the server when the component is coupled to the network. The memory may alternately store a location, such as a web site, from which the server may retrieve the software. The component, which utilizes the processing power of the server, is enabled to function as a stand-alone component with its own processor, and is addressed in the same manner in this the other devices coupled to the in-car sub-network. The system thereby allows inexpensive components to be used in place of components which incorporate their own processors and may be considered prohibitively expensive.

The operation of the in-car sub-network as a component in an external network can be illustrated in several examples. In one scenario, an automobile having an in-car sub-network is driven to a particular city. In the city, a LAN or MAN (metropolitan area network) is set up to establish a wireless connection to a communication device such as a wireless ethernet device. When the automobile drives within range of the LAN/MAN, a connection is established between the in-car sub-network and the LAN/MAN. The in-car sub-network functions as a single IP device coupled to the LAN/MAN and can retrieve information about the city or otherwise interact with devices on the LAN/MAN. Although the in-car sub-network appears to the LAN/MAN as a single device, nodes on the LAN/MAN can exchange packets with devices within the in-car sub-network as a result of network address translation which is being performed within the in-car sub-network.

In another scenario, a service station may have a wireless LAN so that a vehicle equipped with a network and wireless communication device can establish a connection with the LAN as the vehicle pulls into the station. Once the connection is established, the in-car sub-network and LAN can function as a single network. The service station may be configured to request the service records of the vehicle so that any necessary service may be performed. If a software maintenance update is required by one of the components in the vehicle, a server on the LAN may automatically download this information to the appropriate component. Alternately, the user of the vehicle may request information or services. For example, the user may request that music (e.g., in MP3 format) or videos (e.g., in MPEG-2 format) be downloaded for the passengers' entertainment. The user may also have information he or she wishes to have printed, in which case the information could be transmitted to a printer on the service station's LAN, where it could be picked up by the user.

What is claimed is:

1. A method for changing vehicle components comprising:
   providing a vehicle having a network installed therein, wherein said network comprises a transmission medium, a server connected to said transmission medium, a Java ring reader connected to said transmission medium, and a first vehicle component connected to said transmission medium, and wherein said server and said first vehicle component comprise addressable network devices;
   disconnecting said first vehicle component from said transmission medium; and
   connecting a second vehicle component to said transmission medium, wherein said second vehicle component is distinct from said first vehicle component and wherein said second vehicle component is an addressable network device.

2. The method of claim 1 further comprising said network automatically integrating said second vehicle component into said network.

3. The method of claim 2 wherein said network automatically integrating said second vehicle component into said network is performed using a discover-and-join protocol.

4. The method of claim 3 wherein said network automatically integrating said second vehicle component into said network is implemented using Jini.

5. The method of claim 1 wherein said transmission medium is selected from the group consisting of: coaxial cable; twisted pairs of wires; optical fibers; free space; and peripheral connections.

6. The method of claim 1 further comprising coupling said network to an onboard diagnostic system.

7. The method of claim 6 wherein said onboard diagnostic system comprises a dedicated bus and wherein coupling said network to said onboard diagnostic system comprises coupling said network to said dedicated bus.

8. The method as recited in claim 1, wherein the Java ring reader provides a password function.

9. A system for a vehicle comprising:
   a network transmission medium;
   one or more vehicle components coupled to said network transmission medium, wherein said vehicle components comprise addressable network devices;
   a Java ring reader coupled to the network transmission medium, wherein the Java ring reader is configured to control access to the network transmission medium; and
   a communications device coupled to said network transmission medium, said communications device configured to provide wireless communications between said one or more vehicle components and an external network.

10. The system as recited in claim 9, wherein said one or more vehicle components includes one or more of the following:
   a microphone;
   a camera;
   a global positioning system (GPS) receiver;
   on-board diagnostic (OBD) interfaces;
   a compact disk player;
   a radio;
   security devices;
   display devices; and
   local area networks (LANs).

11. The system as recited in claim 9, wherein said one or more network devices are addressable using internet protocol (IP) addresses.

12. The system as recited in claimed 9, wherein said one or more network devices are addressable using object terminology.

13. The system as recited in claim 9, wherein at least one of said network devices is a server.

14. The system as recited in claim 9, wherein said one or more network devices are each configured to transmit and receive data according to a predetermined network protocol.

15. The system as recited in claim 14, wherein said predetermined network protocol is defined by IEEE standard 802.

16. The system as recited in claim 9 further comprising a lookup server, wherein said lookup server is configured to register services corresponding to said one or more network devices.

17. The system as recited in claim 16, wherein said one or more network devices are configured to look up services register on said lookup server and to request one or more of said services register on said lookup server.

18. The system as recited in claim 16, wherein services corresponding to each of said network devices are automatically registered on said lookup server when each of said devices is coupled to said network transmission medium.

19. The system as recited in claim 16, wherein said network services are configured to periodically transmit a notification signal to said lookup server, wherein said notification signal is indicative that said network devices are coupled to said network transmission medium.

20. The system as recited in claim 16, wherein each of said network devices provides data to said lookup server indicating a location external to said network from which said lookup server can retrieve information regarding services corresponding to each of said network devices.

21. The system as recited in claim 9, wherein said transmission medium includes one or more of the following: coaxial cable, twisted pair wiring, free space, optical fibers, and peripheral connections.

22. The system as recited in claim 9, wherein the Java ring reader provides a password function.

* * * * *